UNITED STATES PATENT OFFICE.

LOUIS E. FULLER, OF NEW YORK, N. Y., ASSIGNOR TO A. B. DICK COMPANY, OF CHICAGO, ILLINOIS, A CORPORATION OF ILLINOIS.

STENCIL-SHEET.

1,244,189.  Specification of Letters Patent.  Patented Oct. 23, 1917.

No Drawing.  Application filed February 12, 1916. Serial No. 78,044.

*To all whom it may concern:*

Be it known that I, LOUIS E. FULLER, a citizen of the United States, residing in the borough of Manhattan, city, county, and State of New York, have invented certain new and useful Improvements in Stencil-Sheets, of which the following is a specification.

My invention relates to stencil-sheets suitable for use, for example, in addressing- or duplicating-machines, for the production of multiple copies of written or typewritten matter, diagrams, etc. Heretofore such stencil-sheets have been made largely of coagulated protein, and these, before being stencilized, have been moistened to soften or otherwise affect the coated surface to thereby facilitate the stencilizing operation. The object of the present invention is to produce a stencil-sheet which shall be normally impervious to ink, which may be stencilized without preliminary moistening, and which shall be usable throughout an extended period of time after its preparation.

I shall describe herein preferred methods of practising my invention, without, however, limiting myself thereto, said invention being capable of utilization in different ways, involving substantial variation.

*Imprimis,* I prefer to employ, as the base or foundation of a stencil-sheet employing my invention, a sheet of open porous material, such, for example, as the Japanese paper now in common use and known as "Yoshino", this being admirably adapted to take up and hold the solution and to coact therewith in the operation of stencilizing.

For convenience, I first proceed to prepare what is termed herein "synthetic resin", or phenol resin, *i. e.*, a condensation product of phenol and formaldehyde. In doing this, I preferably add eight parts of 40% formaldehyde to ten parts of commercial white distilled phenol. This I dissolve by means of gentle heat, such as a water-bath. Then ten parts of 15% hydrochloric acid are added, preferably in small portions at a time. After the reaction (which is somewhat violent), it is desirable that the material be kneaded with warm water to remove the acids so far as possible. The precipitated resin is then warmed on the water-bath until glass-clear, to drive off all moisture and remaining acids. I thus produce what I shall refer to herein as "synthetic resin" or "resin."

I next proceed to convert pure glycerin into what will be termed for the purpose of this disclosure "polyglycerol." In doing this, I heat pure glycerin under a reflux condenser to about 240° centigrade, prolonging this operation for from six to ten hours. The resulting material is partly polyglycerol and partly pure glycerin, is quite viscous, and is, of course, less hygroscopic than pure glycerin. Said material, prepared as herein set forth, is referred to in this disclosure as "polyglycerol".

The synthetic resin and polyglycerol, practically without any necessary additional ingredient except a suitable solvent, such as denatured or wood alcohol, may be employed for treating the Yoshino sheet in the usual manner; that is to say, fifty parts of the dried resin may be dissolved in fifty parts of denatured or wood alcohol, and an amount of the polyglycerol is added sufficient to produce a solution which, when the Yoshino sheet is treated therewith, will be sufficiently soft to permit stencilization and yet sufficiently hard to be durable and capable of convenient manipulation. The precise amount of polyglycerol to be added will depend to considerable extent upon the characteristics of the particular lot of resin employed, this being due to the fact that the density of the resin is dependent on the temperature, the rapidity of the reaction, the strength of the acid used as a condensing agent, and the speed with which such agent is added. Generally speaking, it will be found that about one-half part of polyglycerol to one part of resin will produce satisfactory results. If the solution, after the sheet has been treated thereby, proves too sticky, a small amount of calcium carbonate may be added to the solution, and if desired the whole passed through a paint mill.

The solution as above described, at ordinary room temperature, may be placed in a shallow pan, preferably provided with the usual rod for removing excess solution, and a Yoshino sheet may be brought into contact with such solution first near its forward edge and then drawn over said rod so that the solution may be evenly applied over the entire area of the sheet. After this has been done, the sheet may be exposed to the action of the air for a sufficient length of time to dry it, after which it may be stencilized in the usual manner.

Instead of employing the polyglycerol and resin as practically the only important and essential ingredients of my solution as above indicated, I may combine the same to advantage with other ingredients to produce a solution adapted for the same use. In such solution, in addition to the resin and polyglycerol, I employ all or certain of the following ingredients, to wit:—glue, water, alcohol (preferably denatured), alizarin oil, a suitably fatty acid, such, for instance, as pure oleic acid, and a hardening agent, such, for example, as formaldehyde, which acts to harden the solution and also tends to preserve the oils and fats therein from rancidity.

In making up this solution, I take a glue or gelatin of substantial jelly strength, such, for example, as that commercially known as "No. 1 hide glue", ground to reasonably fine particles, and with about twelve grams thereof I combine about thirty-six grams of water. I then add to the solution about forty-two grams of alizarin oil. (If the alizarin oil be found to contain substantially less than fifty per cent. fat, the proportion thereof should be slightly increased, as for example, to forty-five or fifty grams.) I then add to the solution about thirty grams of pure oleic acid and six grams of polyglycerol.

At this point I prefer to agitate well the container in which the solution as thus made up has been compounded, and then warm it in a water-bath at about 190° to 200°, F. As a result of this warming treatment, the glue becomes swollen and a homogeneous mixture is formed.

I then add about twelve grams of a 33% solution of the synthetic resin hereinbefore referred to, in denatured alcohol (i. e., synthetic resin 33⅓%, denatured alcohol 66⅔%). I then add to the solution six grams of commercial formaldehyde, and again subject the solution as a whole to the action of the water-bath, removing it therefrom and agitating slightly from time to time, until all of the ingredients have become thoroughly mixed and the compound as thus finally made up is homogeneous.

At this point, it may be remarked that the solution should, of course, be free from all impurities and even from bubbles or foam, the latter being either allowed to evaporate or being disposed of by the addition to the solution of a few drops of ether. After this shall have been done, the solution is ready for application to the basic fabric of which the sheet is composed, and this may be accomplished in the manner hereinbefore indicated.

A stencil-sheet treated as hereinbefore described may be stencilized in the well known manner, such, for example, as by passing it into a writing-machine in combination with a backing, preferably of firm hard-surfaced paper, the ribbon of the machine being removed and the type impinging directly upon the surface of the stencil-sheet. If desirable for the purpose of obtaining broader lines in the type characters, a sheet of bolting-cloth may be inserted between the stencil-sheet and the backing. After stencilization in the manner suggested, the sheet may be used for the production of multiple copies in any suitable duplicator.

Having thus described my invention, what I claim as new therein and desire to secure by Letters Patent is as follows:—

1. A stencil blank comprising a sheet of fibrous material of loose open texture, impregnated with a composition including a phenol resin and a hygroscopic substance, substantially as set forth.

2. A stencil blank comprising a sheet of fibrous material of loose open texture, impregnated with a composition comprising a phenol resin, substantially as set forth.

3. A stencil blank comprising a sheet of fibrous material of loose open texture, impregnated with a composition including resin and complex tri-hydric alcohol, substantially as set forth.

4. A stencil blank comprising a sheet of fibrous material of loose open texture, impregnated with a hygroscopic composition including a resin, substantially as set forth.

5. A stencil blank comprising a sheet of fibrous material of loose open texture, impregnated with complex tri-hydric alcohol, substantially as set forth.

6. A stencil blank comprising a sheet of fibrous material of loose open texture, impregnated with a composition including a resin and a colloidal substance, substantially as set forth.

7. A stencil blank comprising a sheet of fibrous material of loose open texture, impregnated with a composition including a colloidal substance and polyglycerol, substantially as set forth.

8. A stencil blank comprising a sheet of fibrous material of loose open texture, impregnated with a composition including a coagulated colloid and polyglycerol, substantially as set forth.

9. A stencil blank comprising a sheet of fibrous material of loose open texture, impregnated with a composition including a resin and polyglycerol, substantially as set forth.

10. A stencil blank consisting of a sheet of fibrous material of loose open texture, impregnated with a composition including resin, polyglycerol and a colloidal substance, substantially as set forth.

11. A stencil blank consisting of a sheet of fibrous material of loose open texture, impregnated with a composition including resin, oleic acid and a colloidal substance, substantially as set forth.

12. A stencil blank consisting of a sheet of fibrous material of loose open texture, impregnated with a composition including polyglycerol, oleic acid and a colloidal substance, substantially as set forth.

13. A stencil blank consisiting of a sheet of fibrous material of loose open texture, impregnated with a composition including resin, polyglycerol, oleic acid and a colloidal substance, substantially as set forth.

14. A stencil blank consisting of a sheet of fibrous material of loose open texture, impregnated with a composition including a resin and a coagulated colloidal substance, substantially as set forth.

15. A stencil blank consisting of a sheet of fibrous material treated with a solution including polyglycerol, a colloidal substance and a hardening agent, substantially as set forth.

16. A stencil blank consisting of a sheet of fibrous material treated with a solution including resin, polyglycerol, a colloidal substance and a hardening agent, substantially as set forth.

17. A stencil blank consisting of a sheet of fibrous material treated with a solution including resin, polyglycerol, a colloidal substance, oleic acid and a hardening agent, substantially as set forth.

18. A stencil blank consisting of a sheet of fibrous material treated with a solution including resin, polyglycerol, a colloidal substance, oleic acid, alizarin oil and a hardening agent, substantially as set forth.

19. A stencil blank consisting of a sheet of fibrous material treated with a solution including resin, polyglycerol, a colloidal substance, oleic acid, alizarin oil, and formaldehyde, substantially as set forth.

20. A stencil blank consisting of a sheet of fibrous material treated with a solution including resin, polyglycerol, a colloidal substance, oleic acid, alizarin oil, formaldehyde and alcohol, substantially as set forth.

21. A stencil blank consisting of a sheet of fibrous material treated with a solution including resin, polyglycerol, a colloidal substance, oleic acid, alizarin oil, formaldehyde, alcohol, and water, substantially as set forth.

This specification signed and witnessed this 24th day of December, 1915.

LOUIS E. FULLER.

Witnesses:
S. O. Edmonds,
I. McIntosh.